(12) United States Patent
Richardson et al.

(10) Patent No.: US 8,985,426 B2
(45) Date of Patent: Mar. 24, 2015

(54) FASTENER DRIVER ASSEMBLY (75) Inventors: Thomas Willoughby Richardson, Hinsdale, IL (US); Robert Richard Jennings, Homer Glen, IL (US)

(73) Assignee: Conveyor Accessories, Inc., Burr Ridge, IL (US)

( * ) Notice: Subject to any disclaimer, the term of this patent is extended or adjusted under 35 U.S.C. 154(b) by 620 days.

(21) Appl. No.: 13/282,677

(22) Filed: Oct. 27, 2011

(65) Prior Publication Data

US 2013/0105542 A1  May 2, 2013

(51) Int. Cl.
| | |
|---|---|
| *B21J 15/36* | (2006.01) |
| *B21J 15/10* | (2006.01) |
| *B21J 15/14* | (2006.01) |
| *F16G 3/00* | (2006.01) |
| *F16G 3/16* | (2006.01) |
| *B25D 17/00* | (2006.01) |
| *B25D 17/02* | (2006.01) |
| *B25D 17/08* | (2006.01) |

(52) U.S. Cl.
CPC ............... *B21J 15/105* (2013.01); *B21J 15/36* (2013.01); *B21J 15/14* (2013.01); *F16G 3/003* (2013.01); *F16G 3/16* (2013.01); *B25D 17/005* (2013.01); *B25D 17/02* (2013.01); *B25D 17/08* (2013.01); *B25D 2250/291* (2013.01)
USPC .......................................................... 227/51

(58) Field of Classification Search
USPC ........................... 173/1, 90; 227/51, 140, 147
See application file for complete search history.

(56) References Cited

U.S. PATENT DOCUMENTS

| | | | | |
|---|---|---|---|---|
| 4,299,293 | A | * | 11/1981 | Nikolaev et al. ............... 173/104 |
| 5,487,217 | A | | 1/1996 | Richardson et al. |
| 5,524,808 | A | * | 6/1996 | Vogrig ........................... 227/147 |
| 5,680,790 | A | | 10/1997 | Richardson et al. |
| 7,493,682 | B2 | | 2/2009 | Richardson et al. |
| 2009/0106972 | A1 | | 4/2009 | Richardson et al. |
| 2009/0106973 | A1 | | 4/2009 | Richardson et al. |
| 2009/0107810 | A1 | | 4/2009 | Richardson et al. |

* cited by examiner

*Primary Examiner* — Thanh Truong
*Assistant Examiner* — Xavier A Madison
(74) *Attorney, Agent, or Firm* — Seyfarth Shaw LLP (57) ABSTRACT

A fastener driver, fastener driver assembly and method for operating a fastener driver. The fastener driver includes a shoulder linking a neck to a head, where the shoulder includes a cross-sectional shoulder shape having small and large cross-sectional sections that can be inserted into an opening in a nose piece. The user can then rotate the fastener driver and the larger cross-sectional portions of the shoulder can block the fastener driver assembly from advancing out of the opening. The fastener driver assembly increases the speed of operation by including a plurality of pins on a head of the fastener driver to allow the simultaneous fastening of a plurality of fasteners, and by being adapted to conveniently insert into a conventional power tool such as an air hammer.

13 Claims, 7 Drawing Sheets

FASTENER DRIVER ASSEMBLY

TECHNICAL FIELD OF THE INVENTION

The present application relates generally to a fastener driver assembly. Particularly, the present application relates to a fastener driver assembly having a fastener driver mechanism retained in a nose piece and that receives impact from a reciprocating piston.

BACKGROUND OF THE INVENTION

Conveyor belts are held together by individual fasteners driven into the belt ends to splice the belt together. The industry has strived to increase the efficiency and safety of installing belt fasteners by using a number of systems and devices. For example, U.S. Pat. No. 5,487,217 discloses an air-powered tool that drives a single fastener by disposing fasteners in a collated strip to make the system quick and easy to use in belt shops. The system was designed to be used with a commercial nail gun or other such device so that the user could implement the system with existing tools. The magazine of a traditional nail gun is removed and replaced with multi-prong belt clips to save time.

Other advances, such as that disclosed in U.S. Pat. No. 7,493,682, involve a system that allows the use of various different hammers to drive the fastener into the belt. For example, the system could use an electric hammer normally used to break concrete. The hammer of this system is used to drive a single fastener at a time because the size of the piston is not large enough to effectively drive a multiple pin driver.

In conventional fastener driver systems, the force distributed from a hammer or piston must be distributed effectively throughout the pins or driver in order to sufficiently fasten rivets or other fasteners to the belt. Conventional fastener driver systems also strive to create a simple, portable or removable fastener driver that can be easily held by a user and aligned with corresponding fastener locations on a belt.

SUMMARY OF THE INVENTION

The present application discloses a system, apparatus and method for simultaneously installing a plurality of fasteners, such as rivets, in a convenient, efficient and safe manner. The system includes a nose piece adapted to be coupled to a reciprocating hammer, such as an air-powered hammer, and a fastener driver adapted to be inserted and locked into engagement with the nose piece. The fastener driver includes a shoulder having a shape with long and short cross-sectional portions, and that is adapted to be inserted into an opening in the nosepiece. The fastener driver can be rotated, causing the longer portions of the shoulder cross section to abut a shelf to keep the fastener driver disposed within the nose piece. The fastener driver can be driven by a reciprocating piston of the powered hammer and can quickly, safely, and efficiently simultaneously drive a plurality of fasteners, such as rivets.

In particular, the present application discloses a fastener driver assembly including a fastener driver that includes a head having first and second opposing surfaces and a radial center; a plurality of pins extending from the first surface and adapted to simultaneously impact a plurality of fasteners; a first neck having a neck radial dimension and being coupled to the head at the second surface proximate the radial center; and a shoulder coupled to the first neck and having a shoulder radial dimension larger than the neck radial dimension in a portion of the shoulder; and a nose piece adapted to couple to a tool and including an opening adapted to permit insertion of the fastener driver; and a shelf adapted to abut the shoulder when the shoulder is engaged against the shelf.

Further, a fastener driver assembly is disclosed and includes a fastener driver that includes a head having first and second opposing surfaces and a radial center; a pin extending from the first surface; a first neck having a neck radial dimension and being coupled to the head at the second surface proximate the radial center; and a shoulder coupled to the first neck and having a shoulder radial dimension larger than the neck radial dimension in a portion of the shoulder; and a nose piece adapted to couple with a reciprocating tool and including an opening adapted to receive the shoulder therethrough; and a shelf provided on the inside of the nose piece and adapted to abut the shoulder when the shoulder is inserted through the opening and rotated.

Also disclosed is a method of operating a tool including providing a fastener driver having pins extending from a head in a first direction and a neck extending from the head in a second direction, a first neck having a neck radial dimension and being coupled to the head at the second surface proximate the radial center, and a shoulder coupled to the first neck and having a shoulder radial dimension larger than the neck radial dimension in a portion of the shoulder; moving the fastener driver in the first direction to insert the fastener driver into a nose piece having an opening adapted to allow passage of the shoulder therethrough; rotating the fastener driver; moving the fastener driver in the second direction to dispose the fastener driver within a locking recess of the nose piece; and coupling the nose piece to a tool.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

While the present invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated.

The present invention relates to a fastener driver, fastener driver assembly and method for operating a fastener driver. The fastener driver includes a shoulder coupled to an end of an elongated neck and has a shoulder shape adapted to be inserted into an opening of a nose piece.

The shoulder can include long and short cross sectional portions, such that the user can rotate the fastener driver and the longer portions of the shoulder can serve as barriers to the fastener driver assembly advancing out of the opening. The fastener driver assembly increases the speed of operation by including a plurality of pins on a head of the fastener driver. The convenience of the driver operation is also improved because the fastener driver is easily used with existing reciprocating power tools, such as an air, electric, or battery powered hammer.

Figure 1:
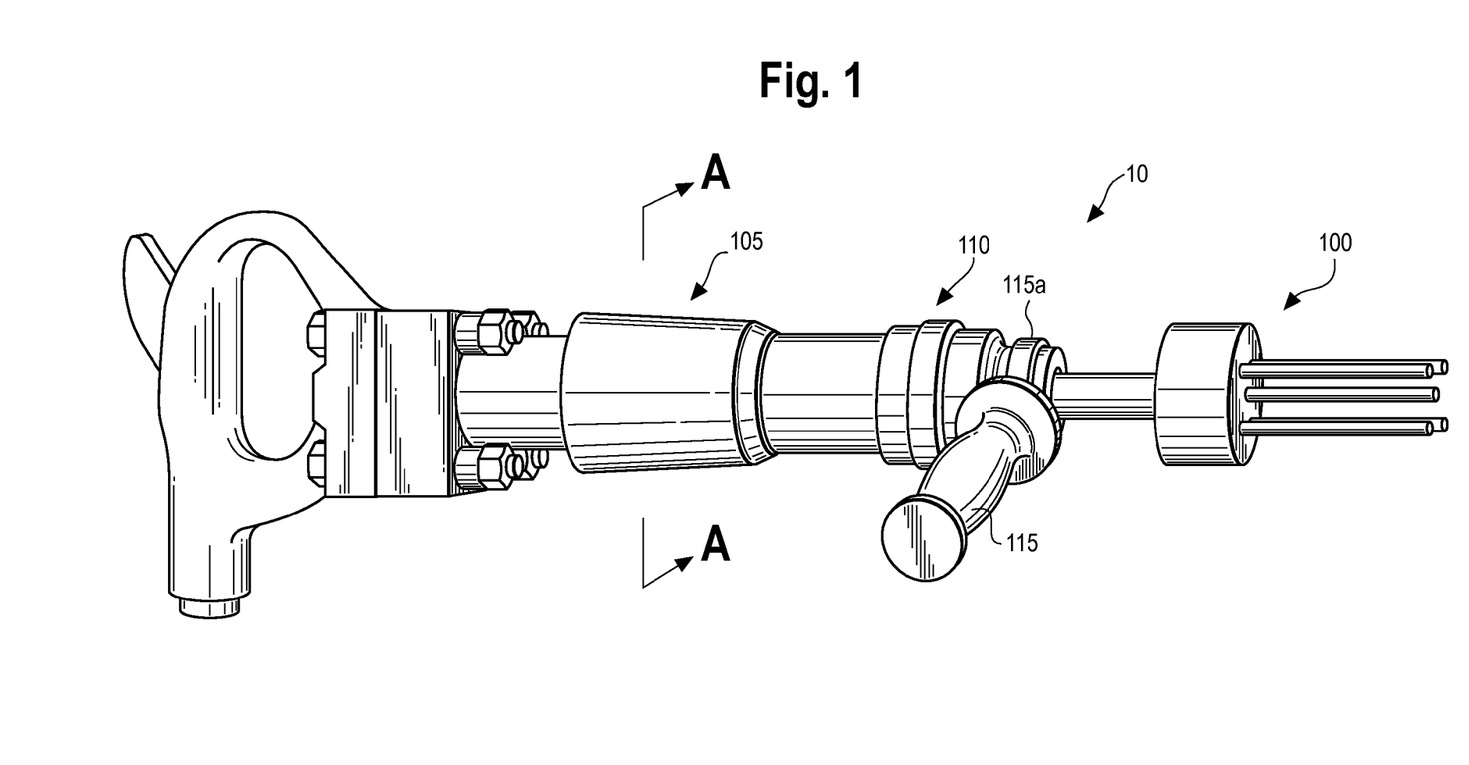
FIG. 1 is a side view of a fastener driver assembly of the present application, as assembled.
Figure 2:
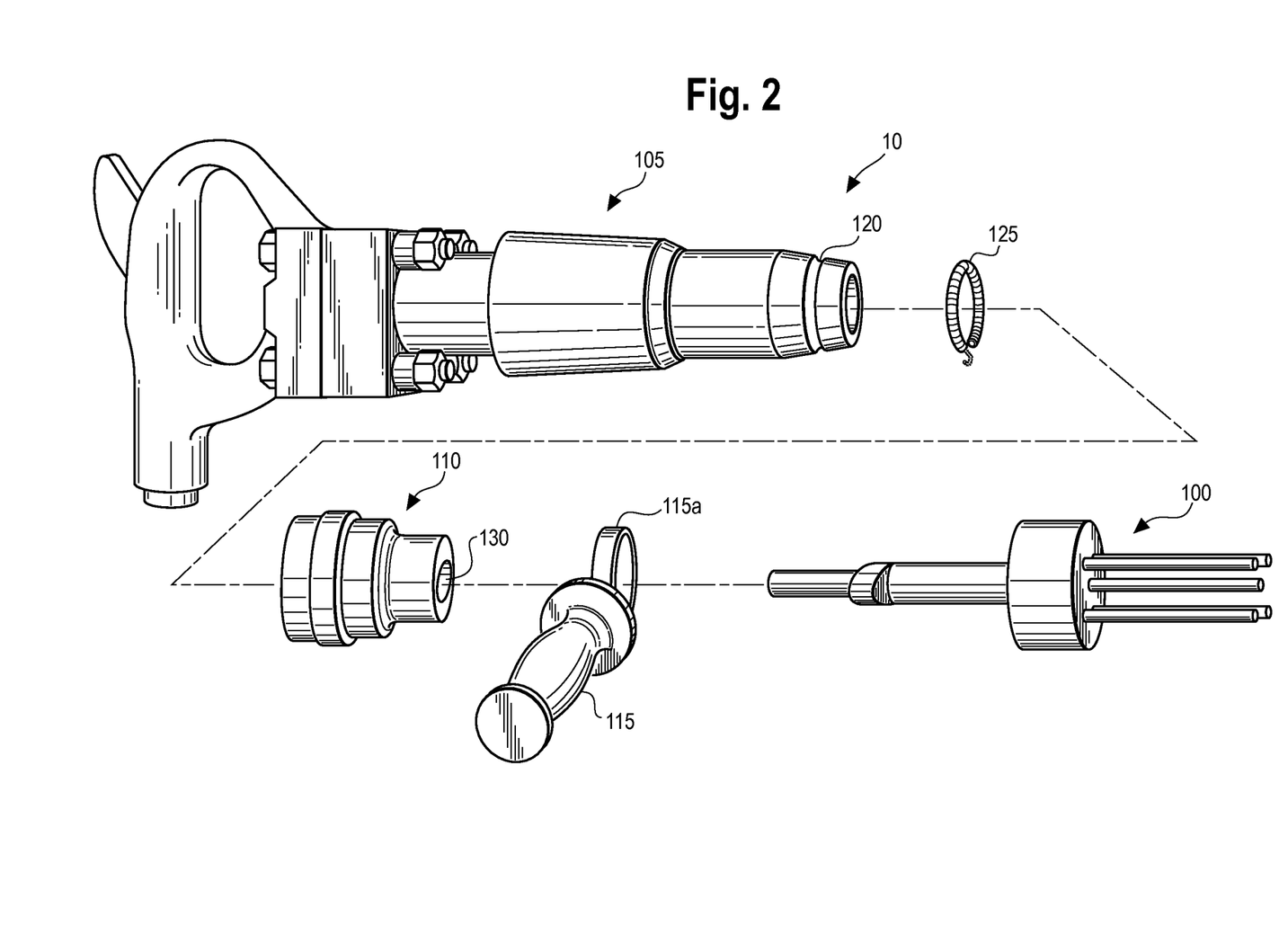
FIG. 2 is a side view of the fastener driver assembly of FIG. 1 in a disassembled condition.

Referring to FIGS. 1 and 2, the fastener assembly 10 includes a fastener driver 100 coupled to a tool 105 by a nose piece 110. A handle 115 may be provided that grips the nose piece 110 with a strap 115A and can be held by the user during operation to control operation of the assembly. The nose piece 110 includes a slot 120 shaped to allow an attachment member 125 to fit inside and couple the nose piece 110 to the tool 105. The nose piece 110 can also include an opening 130 adapted to receive the driver 100.

Figure 3A:
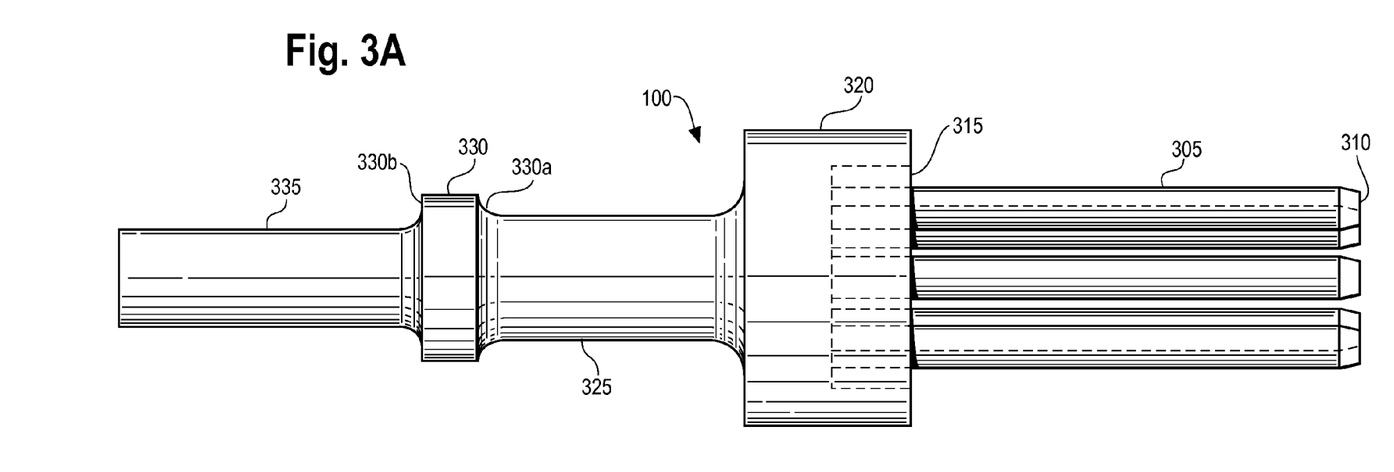
FIG. 3A is a side view of one embodiment of the fastener driver mechanism of FIG. 1.
Figure 3B:
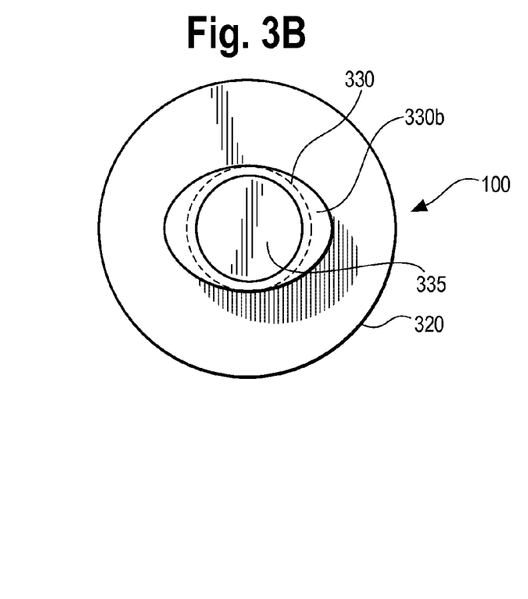
FIG. 3B is a rear view of the fastener driver of FIG. 3A.
Figure 3C:
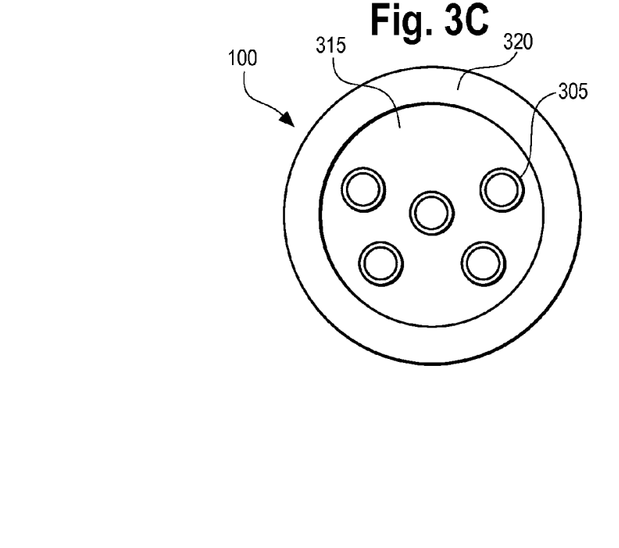
FIG. 3C is a front view of the fastener driver of FIG. 3A.

As shown in FIGS. 3A-3C, the fastener driver 100 includes a plurality of pins 305, each pin having an impact end 310 shaped to strike a fastener, such as a rivet or nail. The pins 305 are provided within an insert 315 located within a head 320, such as that shown in U.S. patent application Ser. No. 12/348,227, incorporated by reference herein in its entirety. A first neck 325 extends from the head 320 to a shoulder 330 at a first surface 330A of the shoulder 330, and a second neck 335 extends from the shoulder 330 from a second surface 330B. As discussed below with respect to FIG. 6, the fastener driver 100 need not include the second neck 335 and can include a single neck embodiment with only the first neck 325.

Figures 4, 4D:
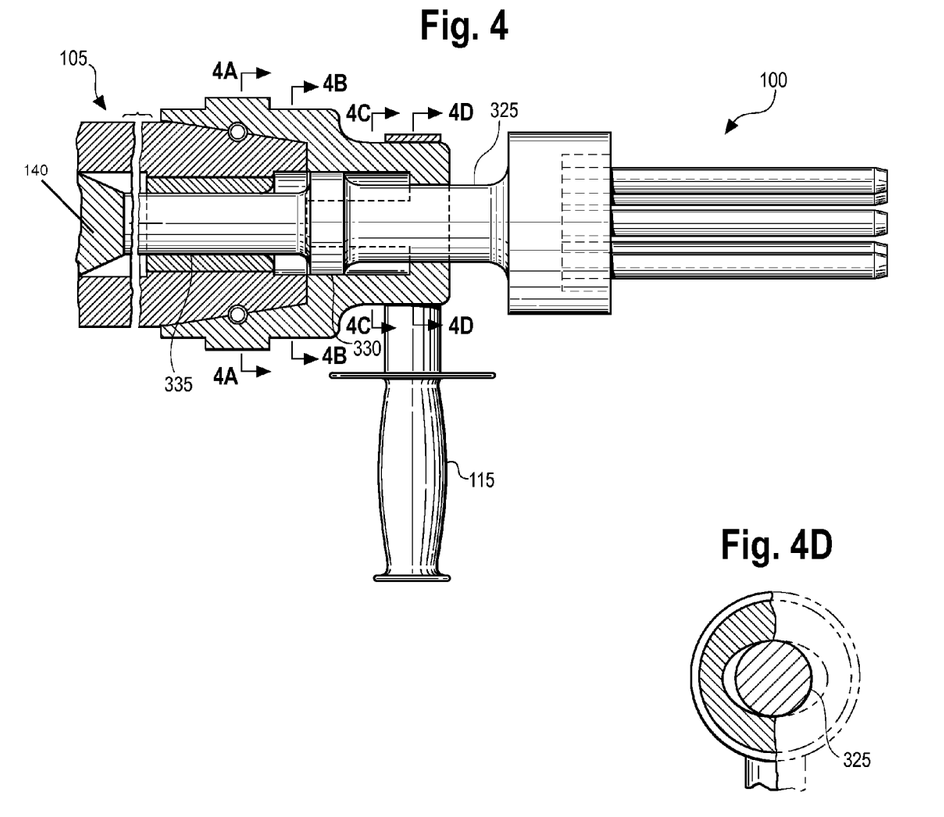
FIG. 4 is a partial cross sectional view of the fastener driver assembly of FIG. 1, as assembled, with the fastener driver in the locked position, taken along line A-A of FIG. 1.
FIGS. 4A-4D are cross sectional views of the fastener driver assembly shown in FIG. 1 respectively taken along lines 4A-4D in FIG. 4.
Figure 4A:
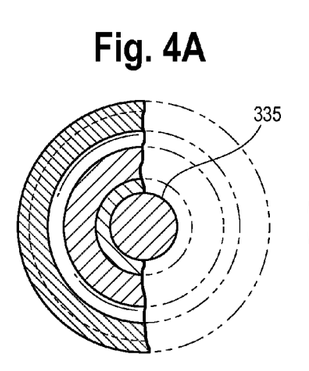
Figure 4B:
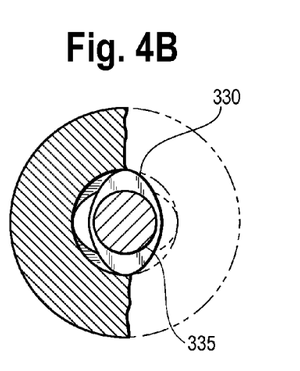
Figure 4C:
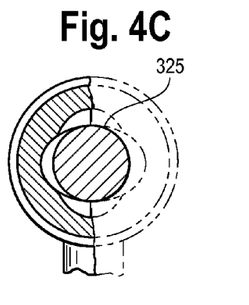
Figures 4E, 4F, 4G:
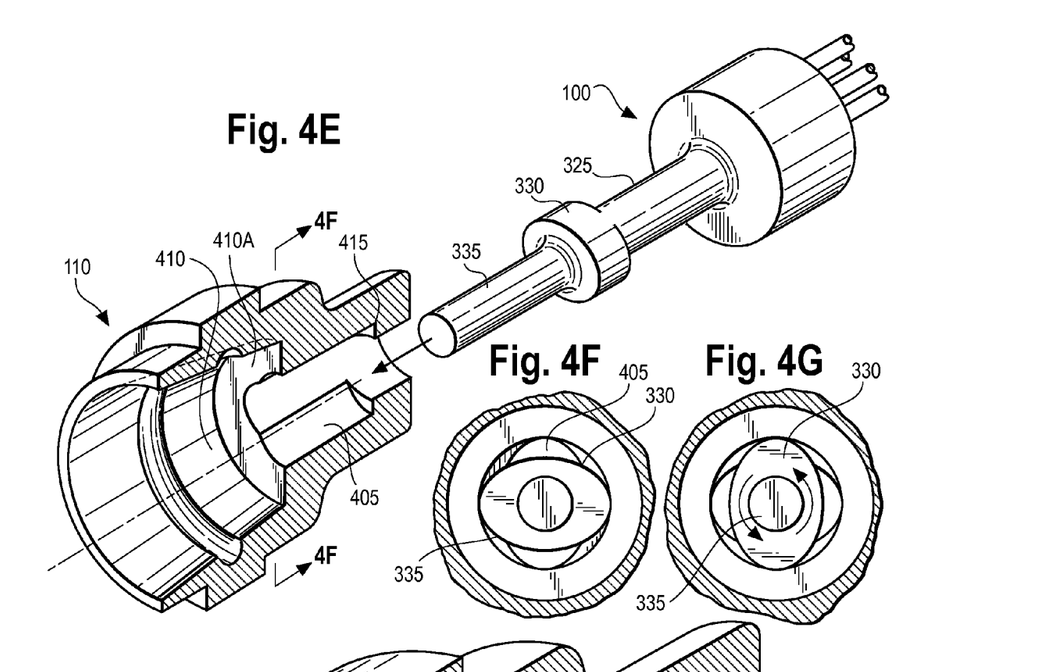
FIG. 4E is an isometric perspective view of the fastener driver assembly with the nose piece shown in cross sectional view.
FIGS. 4F-4G illustrate a rear view of the fastener driver rotated from the unlocked to the locked position.
Figure 4H:
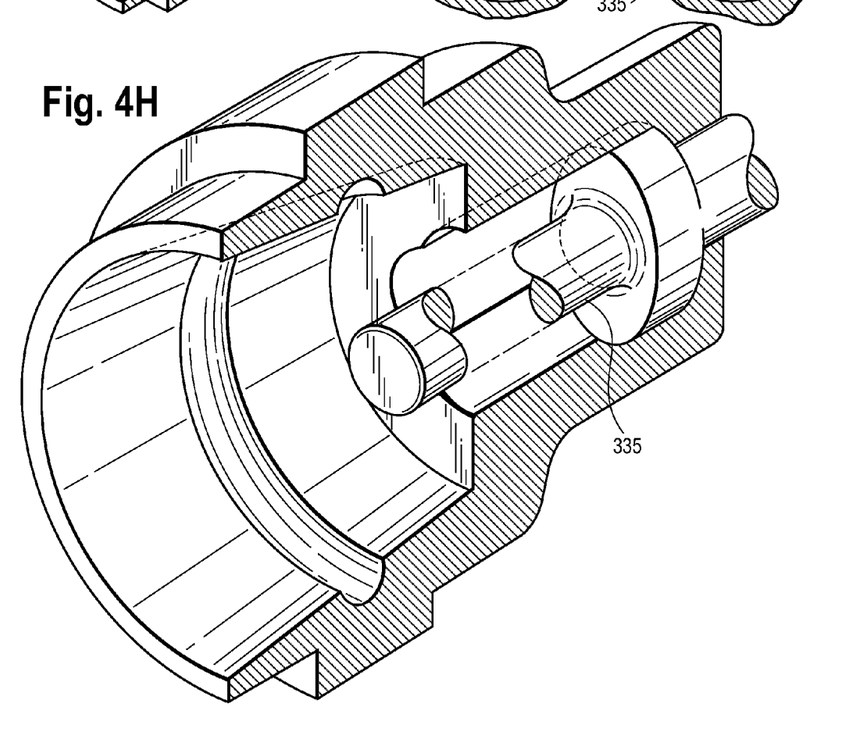
FIG. 4H is an isometric view of the fastener driver in the locked position.

FIGS. 4-4H illustrate sectional views of the fastener driver 100 as assembled with the nose piece 110 and the tool 105. As shown in FIG. 4, the nose piece 110 includes a locking recess 405 and a turning recess 410 with an axial surface 410A on the inside of the nose piece 110. The nose piece 110 can also include a shelf 415 that is adapted to abut the fastener driver 100 when the fastener driver 100 is engaged by the tool 105.

To lock the fastener driver 100 to the tool 105 via the nose piece 110, the user first inserts the fastener driver into the opening 130 of the nose piece 110 by aligning the shape of the shoulder 330 with the shape of the opening 130 and inserting the fastener driver 100 into the opening 130. For example, if the shoulder 330 and opening are each shaped as an ellipse (as shown in FIG. 4), the shoulder 330 can be rotated to align the elliptical shape of the shoulder 330 with the elliptical shape of the opening 130, and the fastener driver 100 can be inserted into the opening 130 thereafter. The fastener driver 100 should be inserted insofar as to allow the shoulder 330 to move into the turning recess 410 and rotate therein.

Once inserted into the nose piece 110, the fastener driver 105 can then be rotated, for example, approximately ninety degrees, as shown in FIGS. 4F and 4G. The rotation can occur when the shoulder 330 is disposed within the turning recess 410 because, in this embodiment, the locking recess 405 forbids such rotation of the shoulder 330 when disposed in the locking recess 405. Following the rotation of the shoulder 330 within the turning recess 410, the fastener driver 105 is inserted into the locking recess 405, as shown in FIG. 4H. The nose piece 110 is then coupled to the tool 105 to complete the installation process.

The above structure is advantageous because it does not allow the shoulder 330 to rotate when locked in the locking recess 405. Rather, the shoulder 330 must be inserted axially insofar as to be located in the turning recess 410, where rotation of the shoulder 330 is possible. When the nose piece 110 is attached to the tool 105, the tool 105 can abut the axial surface 410A of the nose piece 110 to prevent the fastener driver 100 from moving back into the turning recess 410 and rotating. The fastener driver 100 is therefore prevented from turning another ninety degrees and aligning the shoulder 330 with the opening 130 and moving out of the nose piece 110.

The tool 105 can be any tool capable of imparting an impacting force on the fastener driver 100 to drive a fastener, such as a rivet or nail, in a work piece. For example, the tool 105 can be a reciprocating hammer or chisel powered by air, electricity, gas, solar cells, fuel cells, or manual means. In an embodiment, the tool 105 is an air powered hammer variably actuated by a throttle trigger. As discussed throughout this application, the present invention is advantageous in that it can be attached to a multitude of tools and does not require a custom-made tool for operation.

The handle 115 can be any structure that the user can grip to control the fastener driver assembly 10 and align the various pins 305 with corresponding fasteners. For example, the handle 115 can be coupled to the nose piece 110 and/or the tool 105 with a strap 115A and can include a gripping portion made of rubber or another suitable material to allow the user to control the fastener driver assembly 10. The handle 115 can also be coupled to the nose piece 110 and/or the tool 105 using any other means, such as a screw and thread design, or the handle 115 can be permanently coupled to the nose piece and/or the tool 105, without departing from the spirit and scope of the present application.

The handle 115 is advantageous in that it guides and orients the pins 305 in the correct location relative to the fasteners, as disclosed in U.S. Pat. No. 7,493,682, incorporated by reference herein in its entirety. For example, a guide block can hold rivets in place and guide the rivets to the correct location while the pins 305 are driven into the rivets to secure the rivets to a belt. The handle 115 allows for this operation to be better controlled by the user and to more efficiently secure the fasteners during use. When fastening rivets to a belt, for example, the belt technician is required to position the tool 105 seventeen times for each side of the splice for a 60" wide belt, or a total of 34 times for a complete splice. The handle 115 in this process by allowing better control of the tool 105 during the splicing operation.

The slot 120 can be defined within the tool 105 (as shown in FIG. 2) or the nose piece 110 and can be adapted to receive an attachment member 125 to couple the nose piece 110 to the tool 105. As shown in FIG. 1, the slot 120 extends substantially along all or a portion of the circumference of the tool 105 and is adapted to fit a coil spring or other elastic device as the attachment member 125. The attachment member 125 can either couple to individual anchors disposed inside the tool 105 or nose piece 110, or can be adapted to press a portion of the nose piece 110 into elastic engagement with the tool 105. In an embodiment, the attachment member 125 can be disposed in an annular ring of the nose piece 110 and can wrap around the slot 120 of the tool 105 to couple the nose piece 110 to the tool 105.

As shown, the slot 120 can be a combination of semicircular or partial slots formed in both the tool 105 and the nose piece 110 to provide space for the attachment member 125. The partial slots formed in the tool 105 and nose piece 110 can collectively form the slot 120 that surrounds the attachment member 125. Further, a hole can be formed in the nose piece 110 to allow the attachment member 125 to be inserted into the groove 120. Any other position of the hole can be utilized without departing from the spirit and scope of the present invention.

The opening 130 of the nose piece 110 is shaped to receive the shoulder 330. For example, the opening 130 can be shaped as an ellipse to receive a corresponding elliptical shape of the shoulder 330 when the fastener driver 100 is inserted into the opening 130. Alternately, the opening 130 can be shaped as a diamond, triangle, square, or any equivalent shape or structure without departing from the spirit and scope of the present application. The opening 130 and the shoulder 330 need not be corresponding shapes, for example, both being ellipses, so long as the shoulder 330 can insert into the opening 130 and rotate so as to abut the shelf 415 after being inserted into the opening 130.

In an embodiment, the pins 305 are elongated rods adapted to transmit the impact force from the tool 105 to a fastener in order to drive the fastener into a work piece. As shown, each of the pins 305 has a chamfered impact end 310 that further concentrates the impact from the tool 105 to the fastener and allow easier alignment of the pins 305 with respective fasteners. However, the pins 305 can have any shaped impact end 310, for example, round, flat, or pointed, without departing from the spirit and scope of the present application. In an embodiment, the pins 305 are press fit into the insert 315, and the insert 315 is positioned in the head 320. The insert 315 can be interference fit into the head 320, or can be coupled to the head 320 in any other manner.

The structure of the head 320, insert 315 and pins 305 is advantageous in that it allows the user to simultaneously fasten a plurality of fasteners instead of a single fastener, to save time and expense in the operation of fastening a belt or other work piece using a fastener. The fastener driver 100 is also adapted to be coupled to virtually any tool 105 and does not require a custom-made tool for operation.

As shown, the first neck 325 extends from a radial center portion of the head 320 to the shoulder 330 to couple these components together. The second neck 335 similarly extends from the shoulder 330 in a direction opposite of the first neck 325. Both the first neck 325 and the second neck 335 can be cylindrically shaped to fit through the opening 130 of the nose piece 110 and an opening of the tool 105, respectively. Of course, the first neck 325 and second neck 335 can have any cross-sectional shape to accommodate differently shaped openings. As shown, the first neck 325 has a diameter larger than the diameter of the second neck 335 so as to more broadly distribute the impact force from the reciprocating piston 140 to the outer radial areas of the head 320 and, ultimately, to the pins 305.

The shoulder 330 can include a first surface 330A and a second surface 330B, and is shaped to be inserted through the opening 130 and rotated so as to lock the shoulder 330 in place. For example, the shoulder 330 can be shaped as an ellipse with long and short cross-sectional portions. Of course, any other shaped shoulder 330 can be used that allows the shoulder 330 to be inserted through the opening 130 and, after being rotated, to be locked into place. For example, the shoulder 330 can be shaped as a diamond, triangle, square, or any equivalent shape or structure without departing from the spirit and scope of the present application.

The shelf 415 is disposed adjacent the opening 130 and is adapted to abut the shoulder 330 when the fastener driver 100 is reciprocally actuated so as to keep the fastener driver 100 from separating from the nose piece 110. The shelf 415 is shaped so as to abut a portion of the shoulder 330 that is larger than the opening 130. For example, if the shoulder 330 has a shoulder shape that includes a long cross-sectional dimension, the long cross sectional portion can abut the shelf 415 when the fastener driver 100 is actuated. Also, the short cross-sectional portion can have radial dimensions that are slightly smaller than the opening 130 to allow the fastener driver 100 to be removed through the opening 130 when the nose piece 110 is removed from the tool 105 and when the fastener driver 100 is rotated so as to substantially align the shoulder 330 with the opening 130.

Figures 5, 5D:
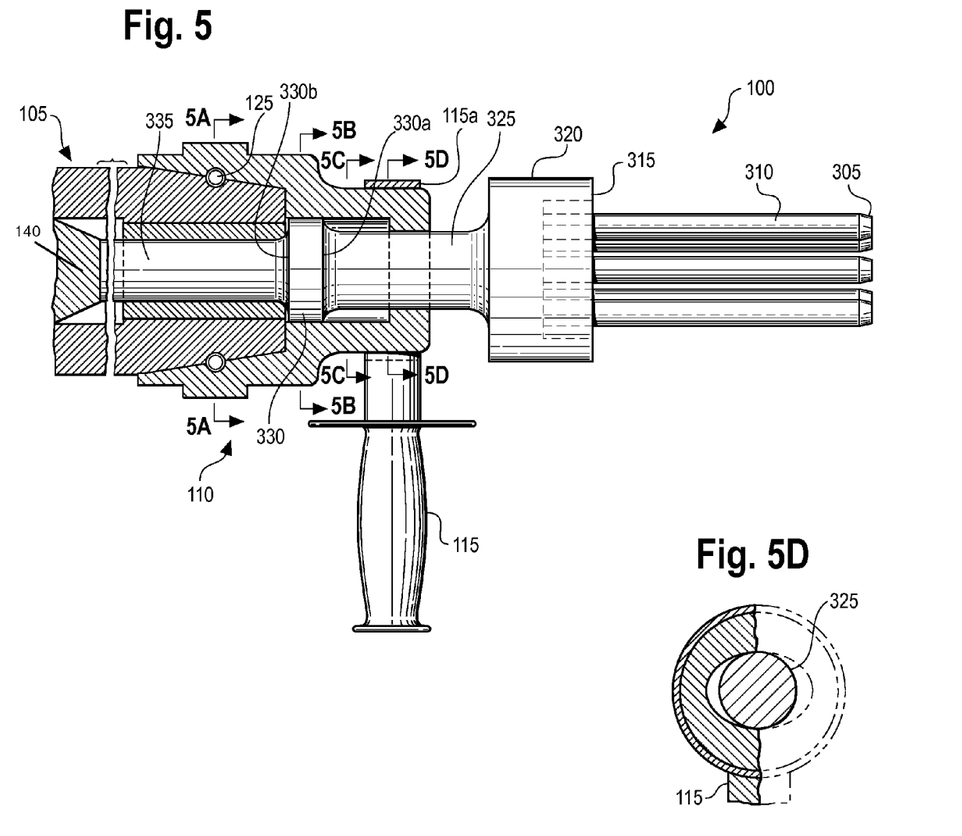
FIG. 5 is a partial cross sectional view of the fastener driver assembly of FIG. 1, as assembled, with the fastener driver in the locked position, taken along line A-A of FIG. 1.
FIGS. 5A-5D are cross sectional views of the fastener driver assembly shown in FIG. 1 respectively taken along lines 5A-5D in FIG. 5.
Figure 5A:
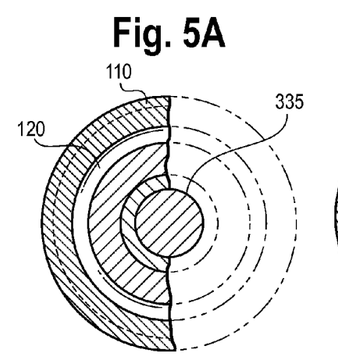
Figure 5B:
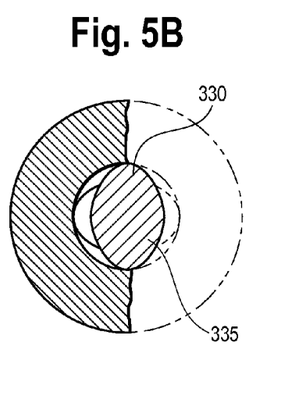
Figure 5C:
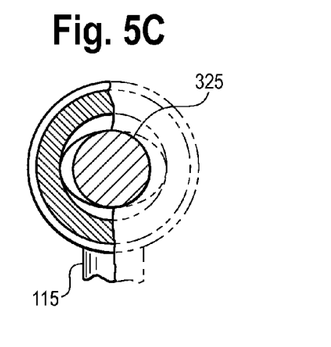
Figures 5E, 5F, 5G:
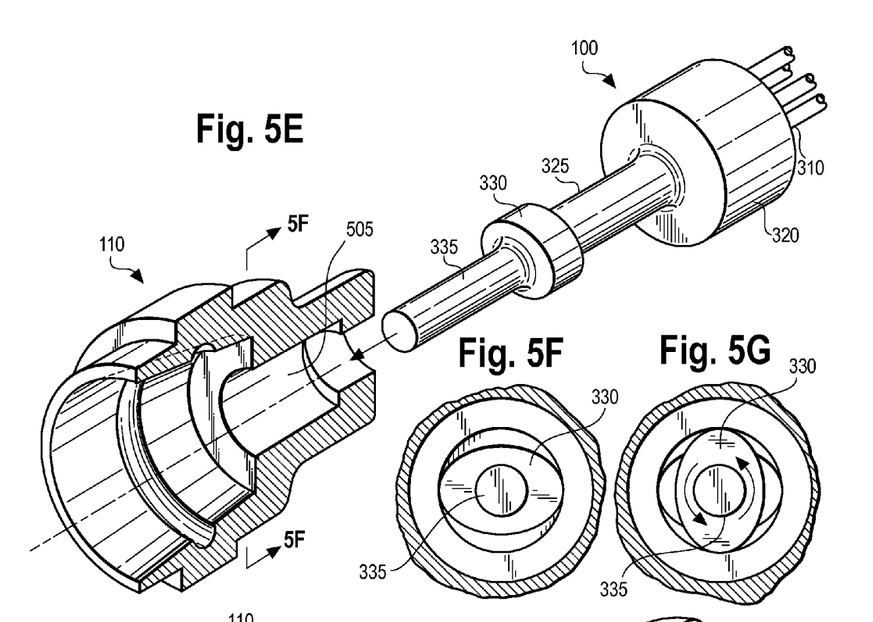
FIG. 5E is an isometric perspective view of the fastener driver assembly with the nose piece shown in cross sectional view.
FIGS. 5F-5G illustrate a rear view of the fastener driver rotated from the unlocked to the locked position.
Figures 5H, 6:
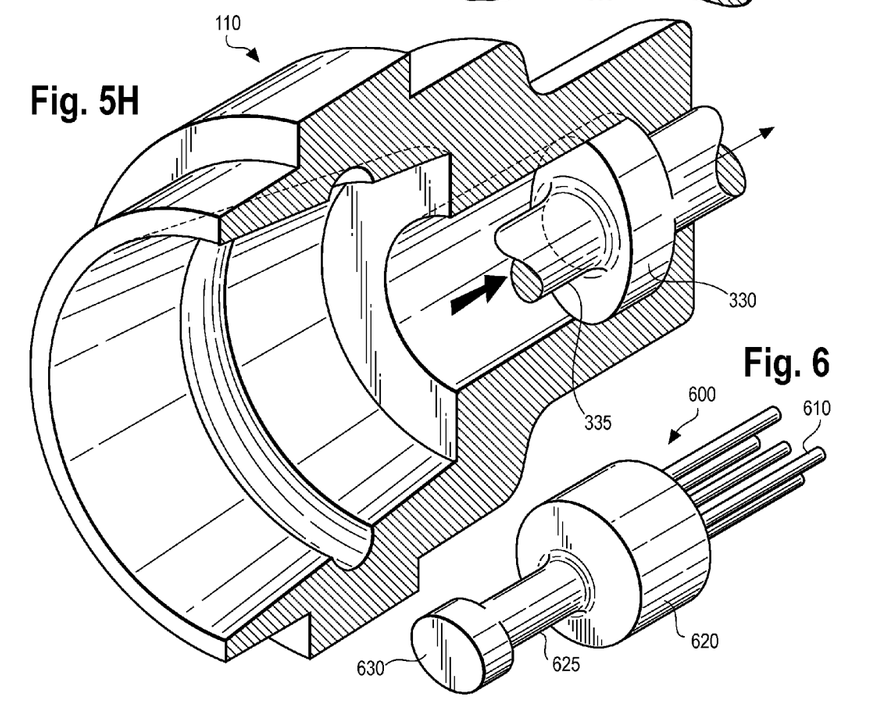
FIG. 5H is an isometric view of the fastener driver in the locked position.
FIG. 6 is an isometric view of a fastener driver.

FIGS. 5-5H illustrate an embodiment of a nose piece 110 in which the shoulder 330 can be inserted through an opening 130 and locked in place without the locking recess 405 or turning recess 410 structures discussed above. In particular, the nose piece 110 includes an opening 130 similar to the opening discussed above with respect to FIGS. 4-4H, and further includes a cavity 505 that permits rotational movement of the shoulder 330 when inserted into the nose piece 110.

A user can lock the fastener driver 100 in place by first removing the nose piece 110 from the tool 105, if applicable. Once the nose piece 110 is removed, the fastener driver 100 can be inserted into the opening 130 by substantially aligning the cross-sectional shape of the shoulder 330 with a corresponding shape of the opening 130, e.g., an ellipse. The user can then insert the fastener driver 100 through the opening 130 until the first surface 330A of the shoulder 330 moves past the opening 130, as shown in FIG. 5E. Unlike the embodiment in FIGS. 4-4H, the embodiment of FIGS. 5-5H need not lock into any locking recess, and can be disposed within the cavity 505 where rotation is permitted.

FIG. 6 illustrates an embodiment of the present invention with a fastener driver 600 that is similar to the fastener driver discussed above, but different in that the fastener driver 600 of FIG. 6 includes no second neck. The impact force from a reciprocating piston of the tool 105 is provided on the shoulder 630 of the fastener driver 600 in order to adequately distribute the impact force to a broader cross-sectional area. The embodiment of FIG. 6 can thus achieve a broad distribution of the impact force from the piston and provide such impact force to the pins 610 to drive fasteners into a work piece.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A fastener driver assembly comprising:
   a fastener driver including:
      a head having first and second opposing surfaces and a radial center;
      a plurality of pins extending from the first surface and adapted to simultaneously respectively impact a plurality of fasteners;
      a first neck having a neck radial dimension and being coupled to the head at the second surface proximate the radial center; and
      a shoulder coupled to the first neck and having a shoulder radial dimension larger than the neck radial dimension in a portion of the shoulder; and
   a nose piece adapted to removably couple to a tool, the nose piece including:
      an opening having first and second ends and adapted to permit insertion of the fastener driver, the opening having an opening shape corresponding to a cross-sectional shape of the shoulder and extending from the first end to the second end, the opening adapted to allow passage of the shoulder from the first end to the second end when the shoulder is inserted into the nose piece;
      a shelf located proximate the second end and adapted to abut the shoulder when the shoulder is engaged against the shelf;
      a passage recess connected to the opening at the second end and having a passage recess shape that at least partially corresponds to the cross-sectional shape of the shoulder, the passage recess preventing rotation of the shoulder when the shoulder is located in the passage recess;
      a turning recess connected to the passage recess and adapted to allow rotation of the shoulder; and
      a locking recess aligned at an angle to the passage recess and extending from the turning recess to the second end of the opening, the locking recess prevent rotation of the shoulder when the shoulder is located in the locking recess.

2. The fastener driver assembly of claim 1, wherein the fastener driver further includes a second neck extending from the shoulder opposite the first neck.

3. The fastener driver assembly of claim 1, wherein the locking and passage recesses are aligned at approximately ninety degrees relative to each another.

4. A fastener driver assembly comprising:
   a fastener driver including:
      a head having first and second opposing surfaces and a radial center;
      a pin extending from the first surface;
      a first neck having a neck radial dimension and being coupled to the head at the second surface proximate the radial center; and
      a shoulder coupled to the first neck and having a shoulder radial dimension larger than the neck radial dimension in a portion of the shoulder; and
   a nose piece adapted to couple with a reciprocating tool and including:
      an opening having first and second ends and adapted to receive the shoulder therethrough from the first end to the second end when the shoulder is inserted into the opening, the opening having an opening shape corresponding to a cross-sectional shape of the shoulder and extending from the first end to the second end;
      a shelf located proximate the second end and adapted to abut the shoulder when the shoulder is inserted through the opening and rotated;
      a passage recess connected to the opening at the second end and having a passage recess shape that at least partially corresponds to the cross-sectional shape of the shoulder, the passage recess preventing rotation of the shoulder when the shoulder is located in the passage recess;
      a turning recess connected to the passage recess and adapted to allow rotation of the shoulder; and
      a locking recess aligned at an angle to the passage recess and extending from the turning recess to the second end of the opening, the locking recess preventing rotation of the shoulder when the shoulder is located in the locking recess.

5. The fastener driver assembly of claim 4, further comprising an attachment member coupled to the nose piece and adapted to couple the nose piece to the reciprocating tool.

6. The fastener driver assembly of claim 4, wherein the locking and passage recesses are aligned at approximately ninety degrees relative to each another.

7. The fastener driver assembly of claim 4, wherein the pin is press fit into an insert disposed in the head.

8. The fastener driver assembly of claim 4, further comprising a handle coupled to the nose piece.

9. The fastener driver assembly of claim 8, wherein the handle includes a strap adapted to grip the nose piece.

10. A method of operating a tool comprising:
    providing a fastener driver having pins extending from a head in a first direction and a neck extending from the head in a second direction, a first neck having a neck radial dimension coupled to the head at the second surface proximate the radial center, and a shoulder coupled to the first neck and having a shoulder radial dimension larger than the neck radial dimension in a portion of the shoulder;
    moving the fastener driver in the first direction to insert the fastener driver into a nose piece having an opening with first and second ends and adapted to allow passage of the shoulder therethrough from the first end to the second end when the shoulder is inserted into the nose piece, the opening having an opening shape corresponding to a cross-sectional shape of the shoulder and extending from the first end to the second end;
    moving the fastener driver past the second end and into a passage recess having a passage recess shape that at least partially corresponds to the cross-sectional shape of the shoulder, the passage recess preventing rotation of the shoulder when the shoulder is located in the passage recess;
    moving the fastener driver through the passage recess and into a turning recess extending from the passage recess;
    rotating the fastener driver within the turning recess;
    moving the fastener driver in the second direction to dispose the fastener driver within a locking recess of the nose piece, the locking recess extending from the turning recess to the second end of the opening, the locking recess preventing rotation of the shoulder when the shoulder is located in the locking recess; and
    coupling the nose piece to a tool.

11. The method of claim 10, further comprising coupling an attachment member to the nose piece to couple the nose piece to the tool.

12. The method of claim 10, further comprising press fitting the pins into an insert, and inserting the insert into the head.

13. The method of claim 10, further comprising coupling a handle to the nose piece.

* * * * *